US010386870B2

(12) United States Patent
Roman

(10) Patent No.: US 10,386,870 B2
(45) Date of Patent: Aug. 20, 2019

(54) THERMOSTATIC DEVICE FOR CONTROLLING THE FLOW OF A FLUID, AND THERMOSTATIC VALVE COMPRISING SUCH A DEVICE

(71) Applicant: VERNET, Ollainville (FR)

(72) Inventor: Jean-Michel Roman, Perthes en Gatinais (FR)

(73) Assignee: VERNET, Ollainville (FR)

( * ) Notice: Subject to any disclaimer, the term of this patent is extended or adjusted under 35 U.S.C. 154(b) by 0 days.

(21) Appl. No.: 15/513,604

(22) PCT Filed: Sep. 24, 2015

(86) PCT No.: PCT/EP2015/072034
§ 371 (c)(1),
(2) Date: Mar. 23, 2017

(87) PCT Pub. No.: WO2016/046340
PCT Pub. Date: Mar. 31, 2016

(65) Prior Publication Data
US 2017/0308105 A1 Oct. 26, 2017

(30) Foreign Application Priority Data
Sep. 25, 2014 (FR) ...................................... 14 59080

(51) Int. Cl.
*F01P 7/16* (2006.01)
*G05D 23/02* (2006.01)
(52) U.S. Cl.
CPC .............. *G05D 23/022* (2013.01); *F01P 7/16* (2013.01)
(58) Field of Classification Search
CPC .................................. F01P 7/16; G05D 23/022
See application file for complete search history.

(56) References Cited

U.S. PATENT DOCUMENTS 8,028,926 B2 * 10/2011 Heldberg .............. F16K 31/002
137/543.21
2005/0001044 A1 1/2005 Masuko et al.
2010/0126594 A1 * 5/2010 Sheppard .................. F01P 7/16
137/340

FOREIGN PATENT DOCUMENTS

CN 201173308 Y 12/2008
CN 203363200 U 12/2013
(Continued)

OTHER PUBLICATIONS

International Search Report (English and French) and PCT Written Opinion (French) dated Apr. 6, 2016 issued in corresponding PCT International Application No. PCT/EP2015/072034.
(Continued)

*Primary Examiner* — Jonathan Bradford
(74) *Attorney, Agent, or Firm* — Troutman Sanders LLP

(57) ABSTRACT

A first module includes a thermostatic element and a main seal. The main seal is, axially movable to open and close a main valve, and is linked to a movable part of the thermostatic element to open the main valve. A spring biases the movable part towards the fixed part of the thermostatic element, controlling the closing of the main valve. A bracket supporting the spring is interposed axially between the spring and a fixed casing. A cradle supports the first module, and removably inserts the first module therein, by axially interposing the cradle between the first module and the spring. The cradle includes a by-pass seal axially movable to open/close a by-pass valve when the main valve is opened/closed. The cradle is linked to the bracket in an axially movable manner, with the spring interposed axially and held fixedly to the bracket to keep the spring compressed.

17 Claims, 4 Drawing Sheets

(56) References Cited

FOREIGN PATENT DOCUMENTS

| | | | |
|---|---|---|---|
| DE | 202010017837 | U1 | 11/2012 |
| EP | 1936141 | A2 | 6/2008 |
| JP | 2008286228 | A | 11/2008 |
| JP | 2010270458 | A | 12/2010 |

OTHER PUBLICATIONS

French Search Report dated May 28, 2015 issued in corresponding French Application No. 1459080.

* cited by examiner

US 10,386,870 B2

THERMOSTATIC DEVICE FOR CONTROLLING THE FLOW OF A FLUID, AND THERMOSTATIC VALVE COMPRISING SUCH A DEVICE

CROSS-REFERENCE TO RELATED APPLICATIONS

This is a U.S. national phase application under 35 U.S.C. § 371 of International Patent Application No. PCT/EP2015/ 072034, filed Sep. 24, 2015, and claims benefit of priority to French Patent Application No. 1459080, Sep. 25, 2014. The entire contents of these applications are hereby incorporated by reference.

TECHNICAL FIELD

The present invention relates to a thermostatic device, as well as a thermostatic valve comprising such a device.

The invention in particular relates to the thermostatic devices and valves that are used in cooling circuits of heat engines, in particular those of motor vehicles, heavy trucks, two-wheeled vehicles and stationary engines. That being said, this scope of application does not limit the invention, inasmuch as the device and the valve according to the invention can be used in various other fluid circuits, for example gearbox cooling circuits, water circuits, oil circuits, etc.

BACKGROUND

In many applications in the fluid field, in particular for cooling vehicle heat engines, thermostatic valves are used to regulate the flow of a fluid, i.e., to distribute this incoming fluid in different flow pathways, based on the temperature of that fluid. These valves are said to be thermostatic inasmuch as the movement of their inner shutter(s) is controlled by a thermostatic element, i.e., an element that comprises a body, containing a thermodilatable material, and a piston, submerged in this thermodilatable material, the body and the piston being movable relative to one another in translation along the longitudinal axis of the piston. A thermodilatable material being one that can expand with an increase in temperature.

The invention more specifically examines three-way valves, which distribute a fluid inlet between two fluid outlets or which supply a fluid outlet from two fluid inlets. These three-way valves are typically used to regulate the flow of a cooling fluid with respect to both an engine to be cooled by this fluid and a heat exchanger, in particular a radiator, cooling this fluid: when the fluid has an excessively high temperature at the valve, the latter sends it to the exchanger to be cooled therein before being sent to the engine to be cooled, then returned to the valve, whereas when the temperature of the fluid is low enough at the valve, the latter sends the fluid directly to the engine, from which it is returned to the valve, via a bypass channel not passing through the exchanger. To that end, the valve includes a main valve, which commands the flow of the fluid with respect to the heat exchanger, and a bypass valve, which commands the flow of the fluid in the aforementioned bypass. EP-A-1,936,141 and US-A-2005/001044 provide examples of this.

The invention examines valves whereof the same thermostatic element actuates, inversely, the main valve and the bypass valve. In this case, it is known that the moving part of the thermostatic element is securely connected to a same piece of equipment including the shutter of the main valve and the shutter of the bypass valve, subject to the interposition of a return spring between this piece of equipment and a bracket, which, during use, is securely connected to a casing or a similar part, fastened to the valve casing to which the stationary part of the thermostatic element is fixedly connected. By further providing that the piece of equipment and the bracket, which, when the valve is in use, are movable relative to one another to open and close the bypass valve, are permanently retained to one another so as to keep the return spring compressed between them, the unit formed by the assembly of the thermostatic element, the piece of equipment, the bracket and the return spring constitutes an integrated device with a pre-stressed spring: such a spring has the advantage of being able to be mounted in a single piece on the aforementioned casings, in particular without using tooling dedicated to compressing the return spring. DE-U-20 2010 017 837 provides one example of this.

The integration of these devices nevertheless has the drawback of causing them not to be very configurable, inasmuch as the design and sizing of such a device are specific to the assembly environment of this device. In particular, due to its design, the aforementioned piece of equipment freezes both the diameter of the shutter of the main valve and the diameter of the shutter of the bypass valve, which therefore limits the possibilities for using pre-existing thermostatic elements, with various shapes and sizes, and which requires the shape of the bracket to be adapted in a specifically dedicated manner. The cost of manufacturing and restocking these devices is affected as a result.

SUMMARY

The aim of the present invention is to propose a thermostatic device of the aforementioned type, which, while being easy to mount within a corresponding thermostatic valve, is more configurable.

To that end, the invention relates to a thermostatic device for regulating the flow of a fluid, comprising:
- a thermostatic element, which includes a stationary part, intended to be securely connected to a first casing that channels the fluid, and a moving part, movable along an axis relative to the stationary part, moving away from the stationary part resulting from expansion of a thermodilatable material of the thermostatic element;
- a main shutter, which is axially movable relative to a stationary seat of the first casing so as to open and close a main valve and which is connected to the moving part of the thermostatic element such that, during expansion of the thermodilatable material, the moving part of the thermostatic element drives the main shutter so as to open the main valve, the main shutter and the thermostatic element being assembled to one another while forming a first module of the thermostatic device;
- a spring, which is compressed in the axis and which returns the moving part toward the stationary part of the thermostatic element during contraction of the thermodilatable material so as to command the closing of the main valve;
- a bracket for bearing the spring, the bracket being intended to be securely connected to a second casing that channels the fluid and that is provided to be fastened to the first casing, while being axially interposed between the spring and the second casing; and
- a cradle for supporting the first module, the cradle:

being suitable for attaching the first module therein removably, by axially interposing the cradle between the first module and the spring, including a bypass shutter, axially movable relative to a fixed seat of the bracket so as both to open a bypass valve when the main valve closes, and to close the bypass valve when the main valve opens, and being connected to the bracket axially movably, with axial interposition of the spring, while being permanently retained at the bracket so as to keep the spring compressed between them, the spring, the bracket and the cradle being assembled to one another independently of the first module, while forming a second module of the thermostatic device, separate from the first module.

One of the ideas at the base of the invention is to avoid having a "completely" integrated device, i.e., each of the components of which would specifically be designed relative to the other components in order to be assembled to one another in a dependent manner. Conversely, the invention seeks to be able to use, within the device according to the invention, various pre-existing thermostatic elements, in particular having various shapes and sizes, and pre-existing main valve shutters, associated with these thermostatic element and able to be broken down into various shapes and sizes, in particular various diameters. To that end, the invention provides that the device is made up of two separate modules, i.e., a first module corresponding to the assembly of the thermostatic element and the shutter of the main valve, the production of this assembly being able to be particularly cost-effective because it can be based on the use of pre-existing parts available at a low cost, and a second module corresponding to the assembly of the bracket, the spring and a removable support cradle of the first module. One clever aspect of the invention lies in the fact that this cradle is designed to accommodate various shapes and sizes of the first module, i.e., various shapes and sizes of the shutter of the main valve and/or the thermostatic element: the first module is attached removably to this cradle, in particular while being essentially, or even solely, placed on the cradle, before the first and second modules are associated within a thermostatic valve, while being jointly mounted on the casings to which the stationary part of thermostatic element of the first module and the bracket of the second module are then respectively securely connected. By providing that the cradle and the bracket are assembled with the spring so as to keep the spring compressed between them, this spring is pre-stressed within the second module, the latter being somewhat comparable to a spring box: the assembly of the device according to the invention on the aforementioned casings is made easier as a result because tooling dedicated to compressing the spring is not necessary. Thus, the device according to the invention separates the assembly of the parts of the first module and the assembly of the parts of the second module from one another, in order to facilitate the design of each of these modules and more easily integrate pre-existing parts into each of them, which reduces the manufacturing and restocking cost of the device according to the invention, while having a device that is practical to mount on valve casings.

In practice, the device according to the invention is naturally integrated into a three-way valve, as mentioned above. That being said, this device can also equip a two-way valve: in this case, the main valve of the device controls the flow of the fluid between the two paths of the valve, while the bypass valve does not provide any regulation between these two paths, but without hindering the regulation done by the main valve.

According to additional advantageous features of the device according to the invention:

The cradle is suitable for attaching the first module removably therein, while connecting them to one another at least by axial bearing of the first module on the cradle.

The cradle is suitable for attaching the first module removably therein, while connecting them to one another at least by axial bearing of the main shutter of the first module on the cradle.

The cradle is suitable for attaching the first module removably therein, while connecting them to one another exclusively by axial bearing of the first module on the cradle.

The cradle is suitable for attaching the first module removably therein, while connecting them to one another exclusively by axial bearing of the main shutter of the first module on the cradle.

The cradle includes, axially opposite the bypass shutter, a crown which is substantially centered on the axis and which has a first face and a second face which are axially opposite, and a sealing gasket of the main shutter bears against the first face of the crown and an end turn of the spring bears against the second face of the crown when the first module is attached to the cradle.

The crown defines, on its second face, a housing for receiving and axially centering the end turn of the spring.

The cradle further includes a part connecting the crown to the bypass shutter, said part being provided with through flow openings for the fluid and said part being arranged radially around and separated from the moving part of the thermostatic element when the first module is attached to the cradle.

The cradle defines at least one surface for radially wedging the first module, which cooperates by shape matching with a frame of the main shutter when the first module is attached to the cradle.

The bypass shutter is a single piece, being integral with the rest of the cradle.

The bypass shutter is integral with the crown via the part connecting them.

The device according to claim 1, wherein the bypass shutter includes both a fixed part which is stationary relative to the rest of the cradle and which cooperates with the fixed seat of the bracket in order to open and close the bypass valve, and a deballasting part which is movable relative to the stationary part of the bypass seal, while being moved against a return spring when an overpressure occurs at the bypass seal.

The fixed seat of the bracket comprises a cylindrical surface, which is substantially centered on the axis and inside which the bypass shutter is received in a complementary manner to close the bypass valve, and the bracket is provided with surfaces guiding the axial sliding of the cradle, said guide surfaces being connected to the fixed seat of the bracket and being distributed around the axis, while defining free flow passages between them for the fluid.

The fixed seat of the bracket consists of a cylindrical surface, which is substantially centered on the axis and inside which the bypass shutter is received in a complementary manner to close the bypass valve, and the bracket is provided with surfaces guiding the axial sliding of the cradle, said guide surfaces being connected to the fixed seat of the bracket and being distributed around the axis, while defining free flow passages between them for the fluid.

The invention also relates to a thermostatic valve, including a first casing and a second casing which are fastened to one another, and further including a thermostatic device as mentioned above, the stationary part of the thermostatic element and the bracket of the thermostatic device being respectively securely connected to the first and second casings.

BRIEF DESCRIPTION OF THE DRAWINGS

As mentioned just above, this valve typically has three paths, but may also have two paths for circuits with no bypass path.

The invention will be better understood upon reading the following description, provided solely as an example and done in reference to the drawings, in which.

DETAILED DESCRIPTION

Figure 1:
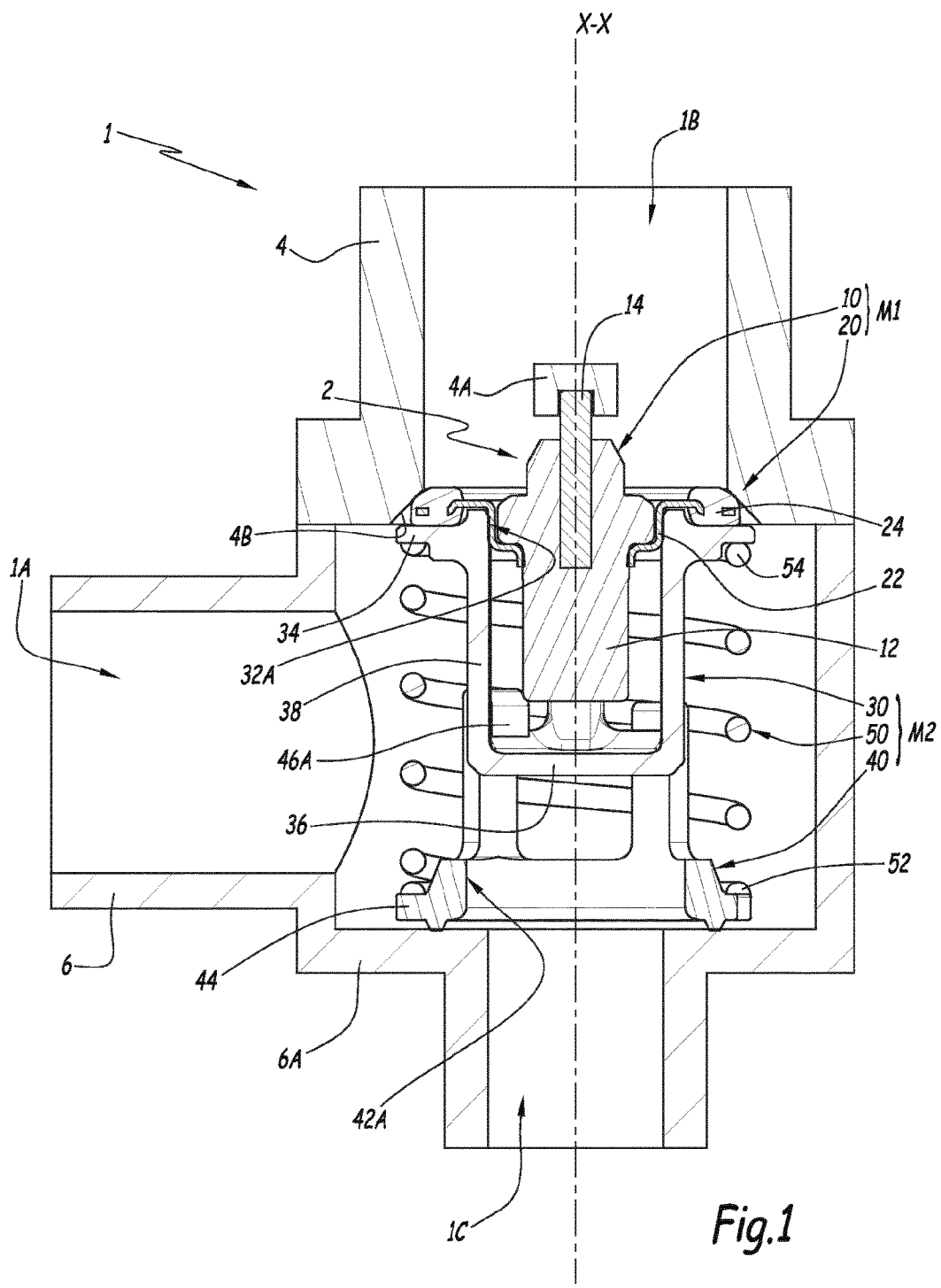
FIG. 1 is a longitudinal sectional view of a thermostatic valve according to the invention.
Figure 2:
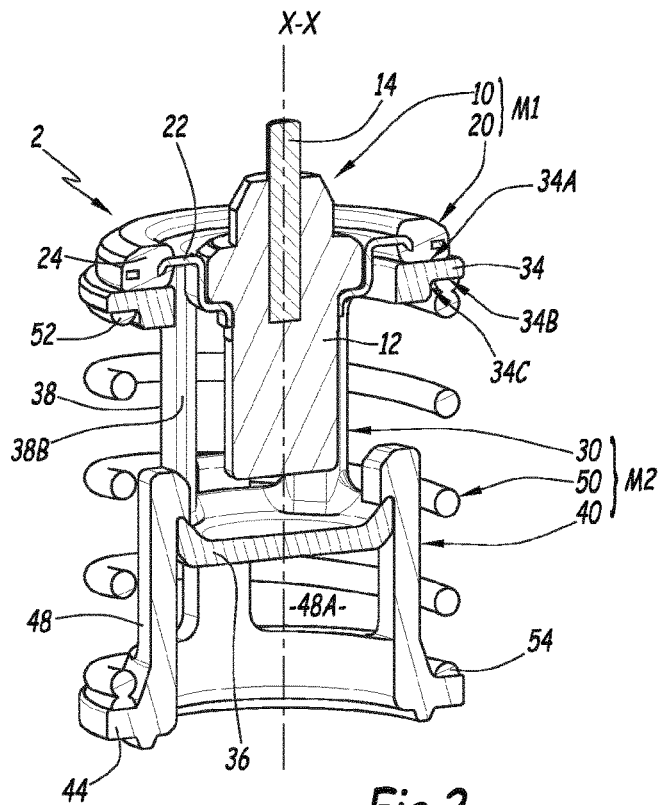
FIG. 2 is a perspective view of a longitudinal half-section of the thermostatic device belonging to the valve of FIG. 1.
Figure 3:
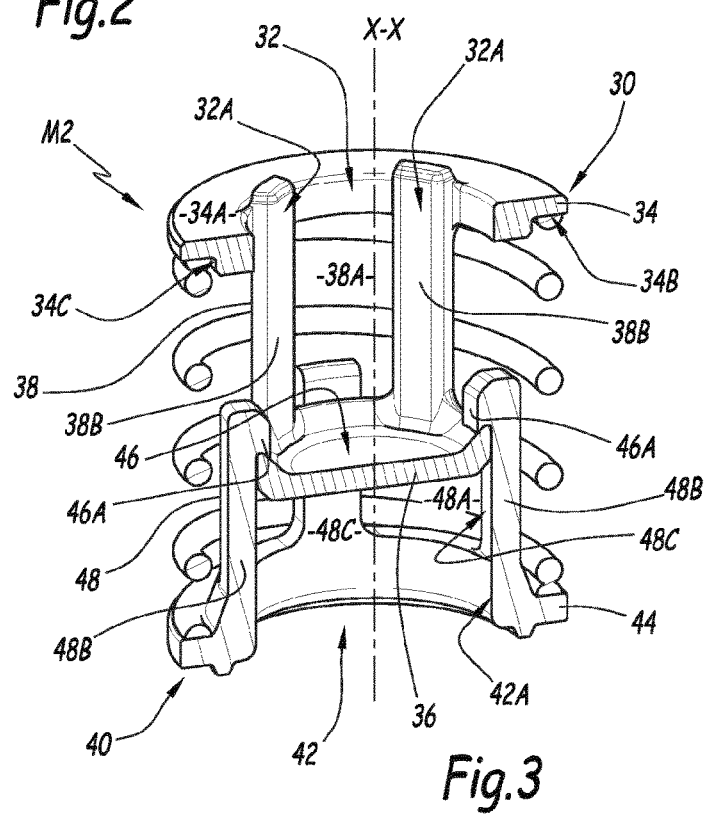
FIG. 3 is a view similar to FIG. 2, showing only part of the device of FIG. 2.
Figure 4:
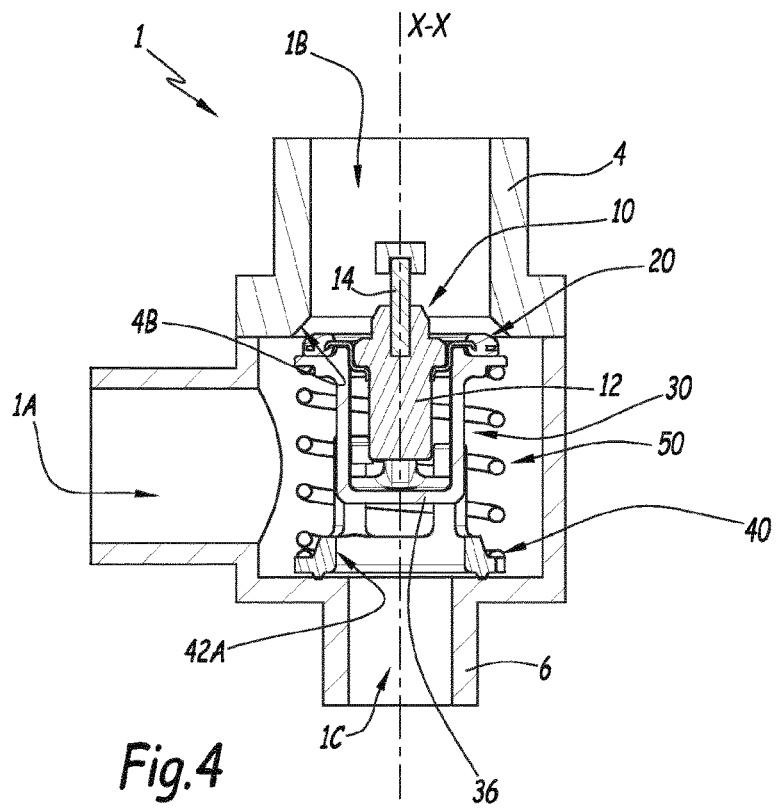
FIGS. 4 and 5 are views similar to FIG. 1, respectively showing operating configurations of the valve different from one another and different from the operating configuration shown in FIG. 1.
Figure 5:
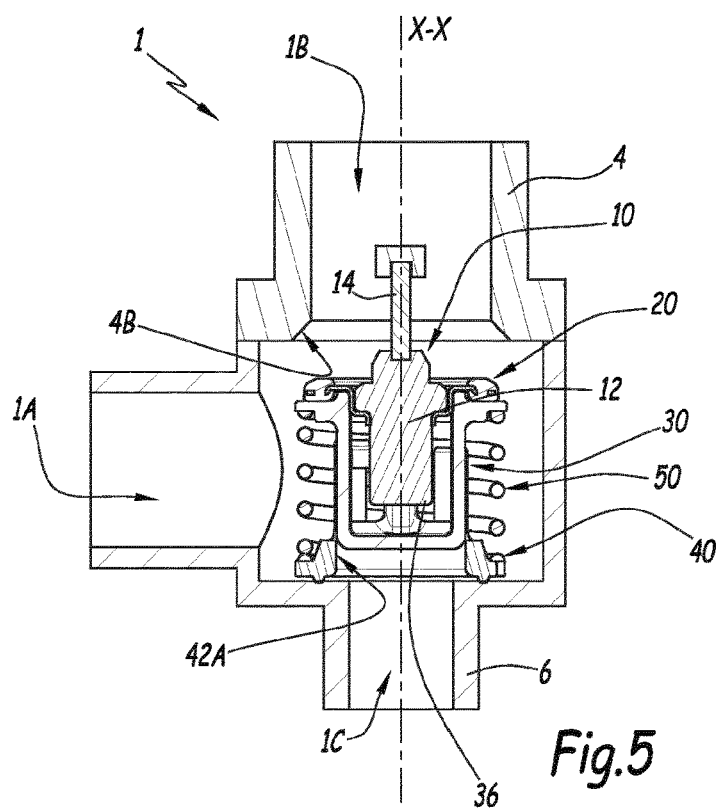

FIGS. 1 to 5 show a valve 1 comprising a thermostatic device 2 for regulating the flow of a fluid. This fluid is in particular a cooling fluid, the valve 1 then for example belonging to a cooling circuit of a heat engine, in particular a motor vehicle engine. The device 2 is shown alone in FIG. 2, whereas in FIGS. 1, 4 and 5, this device is arranged in casings 4 and 6 of the valve 1, having noted that these casings 4 and 6 are stationary relative to one another, in particular securely fastened to one another, when the valve 1 is in use as shown in FIGS. 1, 4 and 5. In practice, in the figures, the casings 4 and 6 are shown only partially and schematically, their embodiment not being limiting with respect to the invention. In all cases, when the valve 1 is in the usage configuration, the casings 4 and 6 channel the fluid by defining three flow paths 1A, 1B and 1C for the fluid: these three paths constitute either one fluid inlet and two fluid outlets, or two fluid inlets and one fluid outlet for the valve 1. As an example that will be mentioned again below, when the valve 1 belongs to a cooling circuit of an engine, the path 1A constitutes a cooling fluid inlet, coming from the engine to be cooled, whereas on the one hand, the path 1B constitutes a first outlet for this cooling fluid, sending the latter to a heat exchanger, in particular a radiator, designed to lower the temperature of the fluid traversing it, before this fluid is sent to the engine to be cooled, and on the other hand, the path 1C constitutes a second outlet for the cooling fluid, which directly sends the latter to the engine to be cooled, without going through the aforementioned heat exchanger. It will be understood that the path 1C feeds a bypass. Thus, the cooling fluid sent to the engine by the valve 1 comes from the outlets 1B and 1C of the latter and, after having cooled this engine, is sent back to the valve, more specifically to its path 1A.

The device 2 includes a thermostatic element 10 that is centered on a geometric axis X-X. This thermostatic element 10 includes a body 12, centered on the axis X-X and containing a thermodilatable material such as a wax. The thermostatic element 10 also comprises a piston 14, the longitudinal geometric axis of which is aligned on the axis X-X within the device 2 and a terminal axial part of which is submerged in the thermodilatable material contained in the body 12. The body 12 and the piston 14 are translatable relative to one another along the axis X-X: under the effect of the expansion of the thermodilatable material, the piston 14 deploys outside the body 12, while, during a contraction of the thermodilatable material, the piston is retractable inside the body 12.

Within the valve 1 when the latter is in use, the piston 14 of the thermostatic element 10 is securely fastened to the casing 4. More specifically, in a manner known in itself, the terminal part of this piston 14, opposite that submerged in the body 12, is securely fastened to a part 4A of the casing 4 arranged across the axis X-X. In practice, various embodiments can be considered regarding the secure fastening of the aforementioned terminal part of the piston 14 to the part 4A of the casing 4: this secure fastening can be done either solely by axial bearing, or by removable fastening, of the clipping or sliding fitting type, or by permanent securing of the forced fitting type, overmolding, or addition of a mechanical maintaining system. In all cases, it will be understood that, when the thermodilatable material of the body 12 of the thermostatic element 10 expands or contracts, the piston 14 is kept immobile relative to the casing 4, due to the secure fastening of its aforementioned terminal part to this casing.

The device 2 also comprises a main shutter 20 that is movable along the axis X-X relative to a stationary seat 4B of the casing 4, so as to open and close a corresponding main valve: within the valve 1 during use, when the shutter 20 is pressed in sealed contact against the seat 4B like in the operating configuration shown in FIG. 1, this seal prevents the fluid from flowing between the paths 1A and 1B, whereas, when the shutter 20 is separated from the seat 4B as in the operating configurations shown in FIGS. 4 and 5, the shutter 20 allows fluid to pass between the paths 1A and 1B, which, in the example embodiment defined above, amounts, within the valve 1, to having at least part of the fluid entering through the path 1A pass into the outlet of the path 1B.

To control the movement of the shutter 20, the latter is securely fastened to the body 12 of the thermostatic element 10 such that, within the valve 1 when it is in use, the axial movement of the body 12 relative to the casing 4, resulting from the expansion of the thermodilatable material, causes a corresponding movement of the shutter 20 so as to open the main valve by axial separation of this shutter 20 with respect to the seat 4B.

In the embodiment considered in the figures, the main shutter 20 comprises a rigid frame 22, typically made from metal, which has a stepped annular shape, substantially centered on the axis X-X, and the periphery of which, turned radially opposite the axis X-X, is provided, for example by overmolding, with a flexible sealing gasket 24, typically made from polymer or rubber. The sealing gasket 24 constitutes the part of the shutter 20 that cooperates with the seat 4B of the casing 4 in order to open and close the main valve, while the frame 22 constitutes a part of the shutter 20 that cooperates with the body 12 of the thermostatic element 10 for the secure connection of the shutter to this body 12, in particular by tight fitting around this body 12 of the periphery, turned radially toward the axis X-X, of this frame 22. Given its embodiment, the shutter 20 considered here is comparable to a gate.

Irrespective of the embodiment of the main shutter 20, it will be noted that the latter and thermostatic element 10 are assembled to one another by forming a first module M1 of the thermostatic device 2, which differs from the rest of this device in that the assembly connection between the shutter 20 and the thermostatic element 10, more specifically between the frame 22 of this shutter and the body 12 of the thermostatic element, is independent of the assembly connections between the other components of the device 2, such that this module M1 can be manipulated in a single piece, separately from the rest of the device 2, in particular so that it may be assembled with the rest of this device.

The thermostatic device 2 further comprises a cradle 30 for supporting the module M1, which is designed so that this module M1 can be removably attached therein. More specifically, in the embodiment considered here, and as clearly shown in FIG. 3, the cradle 30 assumes a tubular global shape, the central axis of which is substantially combined with the axis X-X when the module M1 is attached to this cradle, as clearly shown in FIG. 2. At its axial end turned toward the module M1, the cradle 30 is axially open, forming an axial access opening 32 to the free inner space of the cradle, while being outwardly surrounded by a crown 34, substantially coaxial to the rest of the cradle 30 and extending continuously over the entire outer periphery of the cradle. On its axial side turned opposite the rest of the cradle 30, the crown 34 has a face 34A designed to provide axial bearing for the sealing gasket 24 of the main shutter 20 when the module M1 is attached to the cradle 30. The opening 32 of the cradle 30 is sized to axially engage the body 12 of the thermostatic element 10 therein, as well as at least one peripheral part, turned radially toward the axis X-X, of the frame 22 of the shutter 20, this engagement being provided with no axial interference that would prevent the creation of axial bearing of the sealing gasket 24 against the face 34A of the crown 34. In other words, the cross-section of the opening 32, i.e., the section of the latter in a geometric plane perpendicular to the axis X-X, is larger than, or optionally adjusted to, the largest of the cross-sections of the body 12 and the frame 22, which may axially interfere with the cradle 30 when the module M1 is attached to the cradle and as long as its sealing gasket 24 is not yet axially pressed against the face 34A of the crown 34.

Building on the preceding considerations, and according to one advantageous arrangement that is implemented in the embodiment considered in the figures, the opening 32 of the cradle 30 defines radial wedging surfaces 32A of the module M1, which cooperate by shape matching, in particular by radial bearing, with the frame 22 of the shutter 20 when the module M1 is attached to the cradle: in other words, in its portions corresponding to the aforementioned wedging surfaces 32A, the cross-section of the opening 32 is adjusted to that of the part of the frame 22, arranged across this opening, as clearly shown in FIG. 1.

Taking the above explanations into account, it is understood that, when the module M1 is attached to the cradle 30, the latter is attached thereto removably, in that the connection between the cradle and the module M1 consists exclusively, or at least essentially, of an axial bearing of the shutter 20 on the crown 34 of the cradle, this axial bearing being freely reversible. The cooperation between the wedging surfaces 32A of the cradle 30 and the module M1 makes it possible to avoid a relative misalignment between the cradle and the module M1 when the latter is attached to the cradle: if applicable, in case of radial interference between these wedging surfaces 32A and the module M1, in the case at hand between these surfaces 32A and the frame 22 of the shutter 20, it will be understood that this interference does not permanently connect the module M1 with the cradle 30, but causes a low resistance to the release of the module M1 with respect to the cradle 30 when such a release is desired, for example for maintenance purposes of the device 2. More generally, building on the preceding considerations, in addition to being connected by axial bearing, the module M1 and the cradle 30 are optionally connected in another manner, for example by clipping and/or fitting, as long as this other connection is removable, like the connection by axial bearing.

At its end axially opposite the crown 34, the cradle 30 includes a solid wall 36, which extends across the axis X-X, while being substantially centered on this axis, and which, in the embodiment considered in the figures, axially closes the free space inside the cradle 30. This wall 36 is connected to the crown 34 by a running part 38 of the cradle 30, which defines the free inner space of the cradle and inside which at least part of the body 12 of the thermostatic element 10 and, if applicable, part of the frame 22 of the shutter 20 when the module M1 is connected to the cradle 30, are arranged without interference. Thus, the running part 38 of the cradle 30 is designed to be arranged radially with respect to and at a distance from the body 12 of the thermostatic element, but without preventing the fluid from flowing through it radially with respect to the axis X-X inasmuch as this running part 38 is provided with radially through openings 38A: in the embodiment considered in the figures, this running part 38 consists of arms 38B, which extend lengthwise substantially parallel to the axis X-X, while each connecting the crown 34 to the wall 36 of the cradle 30, and which are distributed regularly around the axis X-X, defining the openings 38A between them, as clearly shown in FIG. 3.

According to one advantageous arrangement, which is also implemented in the embodiment considered in the figures, the cradle 30 is made in the form of a single-piece part, by molding or machining, in that the crown 34, the solid wall 36 and the running part 38 are integral with one another.

The thermostatic device 2 further includes a bracket 40 to which the cradle 30 is movably connected along the axis X-X, typically sliding along this axis. Within the valve 1 when it is in use, the bracket 40 is securely fastened to the casing 6, the embodiment of this secure connection not limiting the invention.

In the example considered in the figures, the bracket 40 has a tubular global shape, the central axis of which is substantially combined with the axis X-X when the valve 1 is in use, and which is axially open at its opposite axial ends.

At its end turned axially opposite the cradle 30, the bracket 40 thus defines an axial access opening 42 to the free inner space of the bracket and is outwardly surrounded by a coaxial collar 44 continuously running over the entire outer periphery of the bracket. It is also at this end that the bracket 40 is securely connected to the casing 6, via axial bearing of its collar 44 against a part 6A of the casing 6, which is arranged across the axis X-X and through which the path 1C is provided: as mentioned above, other embodiments can be considered regarding the secure connection between the bracket 40 and the casing 6, in particular by cooperation between the collar 44 of this bracket and the part 6A of the casing 6, this secure connection advantageously being sealed by any appropriate means. In all cases, the opening 42 of the bracket 30 emerges axially in the path 1C, connecting the latter to the free inner space of the bracket 40, as clearly shown in FIG. 1.

The opening 42 forms a seat 42A for cooperation with the wall 36 of the cradle 30 at the ends of the opening and closing of a corresponding valve, other than the aforementioned main valve and qualified in this document as bypass valve, in particular in connection with the example use of the valve 1 set out above. In the example embodiment considered in the figures, the seat 42A consists of a cylindrical surface defining the opening 42, the cross-section of the cylindrical surface being adjusted to that of the wall 36 of the cradle 30: more generally, it will be understood that the seat 42A is arranged and sized to receive the wall 36 of the cradle 30 along the axis X-X in a complementary manner, like in the operating configuration shown in FIG. 5, such that the wall 36 then closes off the fluid passage inside the opening 42, in other words by closing the aforementioned bypass valve. Of course, when the wall 36 is axially remote from the seat 42A, the bypass valve is open in that the fluid is free to pass through the opening 42 of the bracket 40, thus flowing between the paths 1A and 1C, like in the operating configurations shown in FIGS. 1 and 4. It will therefore be understood that the wall 36 constitutes a shutter of the bypass valve, cooperating, here by sliding axial engagement, with the fixed seat 42A of the bracket 40 in order to open and close the bypass valve.

At its end axially opposite that defining the opening 42, the bracket 40 defines an axial access opening 46 to the free inner space of the bracket. This opening 46 is suitable for receiving the cradle 30, so as to arrange and allow the axial movement of the shutter 36 and the running part 38 of the cradle 30 in the free inner space of the bracket 40.

The opposite axial ends of the bracket 40 are connected to one another by a running part 48 of the bracket, which is provided with free flow passages 48A for the fluid so as to allow the fluid to flow through this running wall 48, radially with respect to the axis X-X: when the bypass valve is open, the fluid passing through the opening 42 can thus rejoin or come from the outside of the bracket 40, via these free passages 48A. In the embodiment considered in the figures, this running part 48 of the bracket 40 consists of arms 48B, which extend lengthwise substantially parallel to the axis X-X while connecting the opposite axial ends of the bracket, and which are distributed regularly around the axis X-X, as clearly shown in FIG. 3. Advantageously, these arms 48 define, on their face turned toward the axis X-X, surfaces 48C for guiding axial sliding of the cradle 30, these surfaces 48C being adjusted to the cross-section of the shutter 36 of the cradle, as clearly shown in FIG. 3. Subject to their connection to the seat 42A, it will be understood that these surfaces 48C guide the shutter 36 over its axial movement travel with respect to the bracket 40 in order to open and close the bypass valve.

The thermostatic device 2 further comprises a spring 50, which, within the valve 1 when the latter is in use, is provided to return the body 12 of the thermostatic element 10 toward the piston 14 of the thermostatic element during a contraction of the thermodilatable material, so as to command the closing of the main valve via the driving, by the body 12, of the shutter 20 with respect to the seat 4B. To that end, the spring 50 is functionally interposed between the body 12 and the piston 14 of the thermostatic element 10 so as to be compressed in the axis X-X when the body 12 and the piston 14 move axially away from one another. More specifically, the spring 50 is physically interposed, in the axis X-X, between the cradle 30 and the bracket 40, while axially interposing the cradle between this spring and the module M1, and while axially interposing the bracket between this spring and the casing 6. Thus, within the valve 1, the spring 50 bears, by one of its axial ends, against the bracket 40, the bearing forces being reacted by the casing 6, whereas, by its opposite axial end, the spring 50 bears against the cradle 30, the corresponding bearing force being transmitted to the module M1.

In the example considered in the figures, an end turn 52 of the spring 50 is pressed against the collar 44 of the bracket 40, more specifically against the face of this collar, opposite the part 6A of the casing 6, while the opposite end turn 54 of the spring 50 bears against the crown 34 of the cradle 30, more specifically against the face 34B of this crown, axially opposite its face 34A. According to one advantageous arrangement, which is implemented in the embodiment considered in the figures, the face 34B of the crown 34 is configured to center the end turn 54 of the spring 50, while defining a housing 34C for receiving and centering this end turn 54. In all cases, it will be understood that when the cradle 30 is moved axially relative to the bracket 40 so as to bring its crown 34 closer to the collar 44 of this bracket and therefore so as to bring its shutter 36 axially closer to the seat 42A, the spring 50 is axially compressed.

Furthermore, the cradle 30 and the bracket 40 are assembled to one another, with axial interposition of the spring 50 as explained above, so as to keep this spring compressed between them. To that end, the cradle 30 is kept permanently at the bracket 40, limiting the amplitude of its axial mobility when the crown 34 moves away from the collar 44. In practice, various embodiments can be configured to thus permanently retain the cradle 30 and the bracket 40 relative to one another when the latter are separated from one another with a distance considered to be maximal, as is the case in FIGS. 2 and 3. In the example embodiment considered in the figures, the opening 46 of the bracket 40 is provided with hooks 46A, the recess of which is both axially open toward the opening 42 and substantially complementary with corresponding portions of the periphery of the shutter 36 of the cradle 30.

Taking the above explanations into account, it will be understood that the cradle 30, the bracket 40 and the spring 50 are assembled to one another while forming a module M2, which is shown alone in FIG. 3 and which is separate from the module M1 described above. Indeed, the assembly of the cradle 30, the bracket 40 and the spring 50 to one another is independent of the assembly of the thermostatic element and the shutter 20 to one another, having recalled that the module M1, formed by the assembly of the thermostatic element 10 and the shutter 20, is provided, within the device 2, to be removably attached to the cradle 30, in particular by connecting this module M1 to the cradle 30 essentially, or even exclusively, by axial bearing. In other words, the module M2 constitutes a sort of spring box on which the module M1 is removably attached so as together to make up the device 2, the modules M1 and M2 next being jointly arranged in the casings 4 and 6 to form the valve 1, as in FIGS. 1, 4 and 5. Because the modules M1 and M2 are separate, resulting from respective assemblies done independently of one another, it will be understood that each of these modules M1 and M2 benefits from greater design freedom, in particular compared to a situation where the device 2 is fully integrated. In particular, for the module M1, this makes it possible to use pre-existing parts for the thermostatic element 10 and/or for the shutter 20. Inasmuch as, within the module M2 considered alone, the spring 50 is kept compressed, the device 2 associating this module M2 and the module M1 remains easy to place within the valve 1, in that it is not necessary to use specialized tooling seeking to compress this spring during commissioning of the valve.

The operation of the valve 1 will now be described in light of FIGS. 1, 4 and 5, in the context of the usage example of this valve mentioned above.

In the operating configuration shown in FIG. 1, the fluid entering through the path 1A is both prevented from flowing in the path 1B due to the closing of the main valve and sent in full to the path 1C owing to the opening of the bypass valve, the fluid flowing by passing successively through the free passages 48A and the opening 42 of the bracket 40. Taking the preceding into account, it will be understood that the passage section of the fluid at the bypass valve can be adjusted as needed, by modifying the diameter of the opening 42 and/or by modifying the axial dimension of the free passages 48A.

If the temperature of the fluid supplying the path 1A increases, the thermodilatable material of the thermostatic element 10 expands, the heat from the fluid being transmitted to this thermodilatable material because the body 12 is swept by fluid currents flowing through the openings 38A of the cradle 30. The axial movement of the body 12 relative to the piston 14, which is stationary relative to the casings 4 and 6, drives the corresponding axial movement of the shutter 20, and thus of the cradle 30, against which the shutter 20 is axially pressed. As shown in FIG. 4, the main valve then opens gradually, by axial separation of the shutter 20 with respect to the seat 4B, whereas, at the same time, the bypass valve gradually closes, by bringing the shutter 36 axially closer to the seat 42A. The fluid allowed in the path 1A is then distributed between the path 1B and the path 1C.

If the temperature of the fluid supplying the path 1A continues to increase, the main valve opens more, while the bypass valve closes more in a corresponding manner, until, if applicable, it is completely closed, by sealing of the seat 42A by the shutter 36, as shown in FIG. 5.

If the temperature of the fluid supplying the path 1A next decreases, the thermodilatable material of the thermostatic element 10 contracts and, under the decompression effect of the spring 50, the cradle 30, and thus the module M1, are driven axially so as to gradually open the bypass valve and gradually close the main valve.

Figure 6:
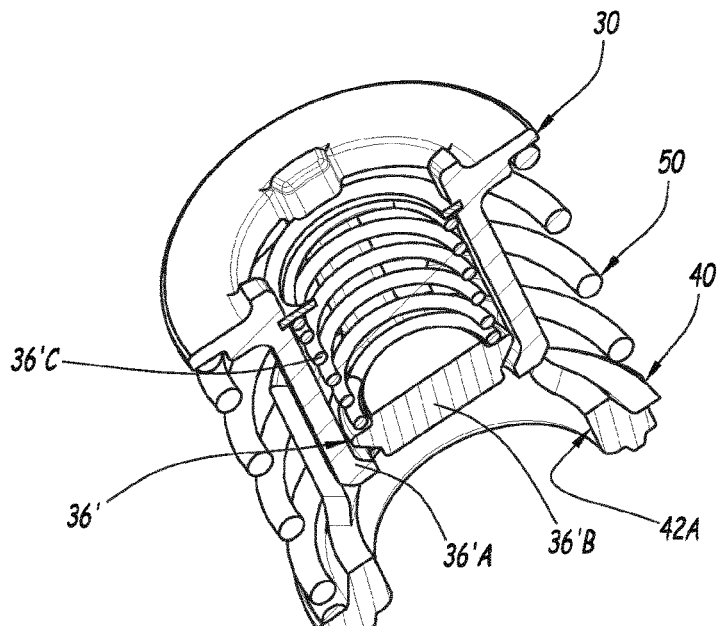
FIG. 6 is a view similar to FIG. 3, illustrating an alternative of the thermostatic device according to the invention.
Figure 7:
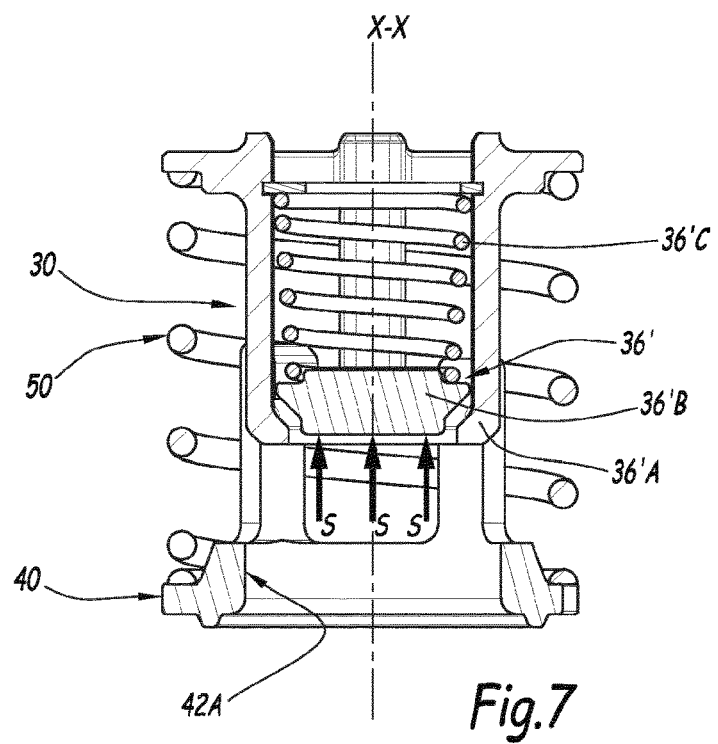
FIG. 7 is a longitudinal sectional view of the alternative of FIG. 6, showing an operating configuration different from that shown in FIG. 6.

Various arrangements and alternatives to the device 2 and valve 1 described thus far may be considered. As examples:
rather than forming a single piece like in the embodiment shown in FIGS. 1 to 5, the shutter of the bypass valve may, like in the alternative of the module M2 shown in FIGS. 6 and 7, in which this shutter is referenced 36', include both a part 36'A that is stationary relative to the rest of the cradle 30 and that cooperates with the seat 42A of the bracket 40 in order to open and close the bypass valve in a manner functionally similar to the shutter 36, and a deballasting part 36'B that is movable relative to the stationary part 36'A and that is designed so as, during an overpressure of the fluid on this moving part 36B, as indicated by the arrows S in FIG. 7, to move against a dedicated return spring 36'C integrated in the cradle 30; more generally, it will be understood that, within the module M2, the shutter of the bypass valve can therefore incorporate a deballasting function;
rather than securely connecting the piston 14 of the thermostatic element to the casing 4, the body 12 of this thermostatic element may be provided to be stationary relative to the casing, the piston 14 then constituting the moving part of the thermostatic element, while performing the driving function described for the body 12 in light of FIGS. 1 to 5;
rather than being securely connected to the moving part of the thermostatic element, the shutter 20 may be mounted on this moving part with a free movement along the axis X-X, on the condition that it is associated with a dedicated return spring; the shutter 20 then incorporates a deballasting function in case of overpressure at the main valve;
embodiments other than the hooks 46A can be considered to permanently keep the cradle 30 and the bracket 40 assembled movably along the axis X-X; in particular, the retaining can be provided by fitting, bayonet coupling, etc.;
the materials making up the different parts of the device 2 are not limiting;
in order to reinforce the sealing, gaskets or similar sealing parts may be added at least at some of the contact interfaces between the parts of the device 2; and/or
the embodiment of the thermostatic element 10 is not limiting, inasmuch as this element may optionally be controlled, i.e., incorporate a heating electric resistance, or may assume various diameters, etc.

The invention claimed is:

1. A thermostatic device controlling flow of a fluid, comprising:
a first module; and
a second module that is separate from the first module;
wherein the first module comprises:
a thermostatic element, which comprises a stationary part, intended to be securely connected to a first casing that channels the fluid, and a moving part, movable along an axis relative to the stationary part, the moving part being moved away from the stationary part as a result of expansion of a thermodilatable material of the thermostatic element, and
a main shutter, which is axially movable relative to a stationary seat of the first casing so as to open and close a main valve, the main shutter including a flexible sealing gasket and a rigid frame which is securely provided with the sealing gasket, the sealing gasket being pressed in sealed contact against the stationary seat to close the main valve, and the frame being securely connected to the moving part of the thermostatic element such that, during expansion of the thermodilatable material, the moving part of the thermostatic element drives the main shutter so as to open the main valve;
wherein the second module comprises:
a spring, which is compressed in the axis and which returns the moving part toward the stationary part of the thermostatic element during contraction of the thermodilatable material so as to command closing of the main valve,
a bracket bearing the spring, the bracket being intended to be securely connected to a second casing that channels the fluid and that is provided to be fastened to the first casing, while being axially interposed between the spring and the second casing, and a cradle supporting the first module, the cradle:
being designed to removably attach the first module therein, by axially interposing the cradle between the first module and the spring,
comprising a bypass shutter, axially movable relative to a fixed seat of the bracket so as both to open a bypass valve when the main valve closes, and to close the bypass valve when the main valve opens, and
being connected to the bracket axially movably, with axial interposition of the spring, while being permanently retained at the bracket so as to keep the spring compressed between the cradle and the bracket;
wherein the sealing gasket, the frame and the thermostatic element are securely assembled to one another independently of the second module, to make the first module maneuverable as a single piece separately from the second module; and
wherein the spring, the bracket and the cradle are assembled to one another independently of the first module, to make the second module maneuverable as a single piece separately from the first module.

2. The device according to claim 1, wherein the cradle is designed to removably attach the first module therein so that the cradle and the first module are connected to one another at least by axial bearing of the first module on the cradle.

3. The device according to claim 2, wherein the cradle is designed to removably attach the first module therein so that the cradle and the first module are connected to one another at least by axial bearing of the main shutter on the cradle.

4. The device according to claim 1, wherein the cradle is designed to removably attach the first module therein so that the cradle and the first module are connected to one another exclusively by axial bearing of the first module on the cradle.

5. The device according to claim 4, wherein the cradle is designed to removably attach the first module therein so that the cradle and the first module are connected to one another exclusively by axial bearing of the main shutter on the cradle.

6. The device according to claim 1, wherein the cradle comprises, axially opposite the bypass shutter, a crown which is substantially centered on the axis and which has a first face and a second face which are axially opposite, and in that a sealing gasket of the main shutter bears against the first face of the crown and an end turn of the spring bears against the second face of the crown when the first module is attached to the cradle.

7. The device according to claim 6, wherein the crown defines, on its second face, a housing receiving and axially centering the end turn of the spring.

8. The device according to claim 6, wherein the cradle further comprises a connecting part connecting the crown to the bypass shutter, said connecting part being provided with through flow openings for the fluid and said connecting part being arranged radially around and separated from the moving part of the thermostatic element when the first module is attached to the cradle.

9. The device according to claim 1, wherein the cradle defines at least one surface for radially wedging the first module, which cooperates by shape matching with a frame of the main shutter when the first module is attached to the cradle.

10. The device according to claim 1, wherein the bypass shutter is a single piece, being integral with the rest of the cradle.

11. The device according to claim 8, wherein the bypass shutter is integral with the crown via said connecting part.

12. The device according to claim 1, wherein the bypass shutter comprises both a fixed part which is stationary relative to the rest of the cradle and which cooperates with the fixed seat of the bracket in order to open and close the bypass valve, and a deballasting part which is movable relative to the fixed part of the bypass shutter, the deballasting part being moved against a return spring when an overpressure occurs at the bypass shutter.

13. The device according to claim 1, wherein the fixed seat of the bracket comprises a cylindrical surface, which is substantially centered on the axis and inside which the bypass shutter is received in a complementary manner to close the bypass valve; and wherein the bracket is provided with guide surfaces guiding the axial sliding of the cradle, said guide surfaces being connected to the fixed seat of the bracket and being distributed around the axis so that free flow passages for the fluid are defined between the guide surfaces.

14. The device according to claim 1, wherein the fixed seat of the bracket consists of a cylindrical surface, which is substantially centered on the axis and inside which the bypass shutter is received in a complementary manner to close the bypass valve; and in that the bracket is provided with guide surfaces guiding the axial sliding of the cradle, said guide surfaces being connected to the fixed seat of the bracket and being distributed around the axis so that free flow passages for the fluid are defined between the guide surfaces.

15. A thermostatic valve comprising a first casing and a second casing which are fastened to one another, and further comprising a thermostatic device according to claim 1, the stationary part of the thermostatic element and the bracket of the thermostatic device being respectively securely connected to the first and second casings.

16. The device according to claim 1, wherein the frame is tight fitted around the moving part of the thermostatic element.

17. The device according to claim 16, wherein the sealing gasket is secured to the frame by overmolding.

* * * * *